US012568440B2

(12) United States Patent
Lnu et al.

(10) Patent No.: US 12,568,440 B2
(45) Date of Patent: Mar. 3, 2026

(54) SYSTEMS AND METHODS FOR COMPANION-ASSISTED THERMAL / POWER MANAGEMENT

(71) Applicant: Meta Platforms Technologies, LLC, Menlo Park, CA (US)

(72) Inventors: Sumeet Kumar Lnu, San Jose, CA (US); Rahul Srivastava, Santa Clara, CA (US); Siddharth Ray, Cupertino, CA (US); Neelakantan Nurani Krishnan, San Jose, CA (US); Shivank Nayak, Milpitas, CA (US); Alireza Kalantari, San Diego, CA (US); Anupama Padminidevi Karthikeyan Nair, Milpitas, CA (US); Hazim Shafi, San Jose, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 518 days.

(21) Appl. No.: 18/128,295

(22) Filed: Mar. 30, 2023

(65) Prior Publication Data
US 2024/0334336 A1     Oct. 3, 2024

(51) Int. Cl.
*H04W 24/10* (2009.01)
*H04W 52/02* (2009.01)

(52) U.S. Cl.
CPC ....... *H04W 52/0248* (2013.01); *H04W 24/10* (2013.01)

(58) Field of Classification Search
CPC .......................... H04W 52/0248; H04W 24/10
See application file for complete search history.

(56) References Cited

U.S. PATENT DOCUMENTS

2016/0164831 A1* 6/2016 Kim .................... H04L 61/2589
                                                              709/223
2022/0022077 A1* 1/2022 Maganti .............. H04B 17/318

* cited by examiner

*Primary Examiner* — Chuong A Ngo
(74) *Attorney, Agent, or Firm* — Foley & Lardner LLP

(57) ABSTRACT

Systems and methods for companion-assisted thermal or power management may include a first device that may transmit metrics indicative of device condition(s) of the first device to a second device via a network maintained by the first device. The second device may receive the metrics, and determine a duty cycle for transmitting a data file between the first device and second device, according to the metrics. The transmitting device may generate a plurality of data packets according to the duty cycle, with each data packet including a portion of a payload of the data file. The transmitting device may transmit each of the plurality of data packets at the determined duty cycle to the receiving device. The receiving device may generate a corresponding data file using each of the plurality of first data packets, responsive to receiving each of the plurality of data packets.

20 Claims, 8 Drawing Sheets

100

200

250

700

800

SYSTEMS AND METHODS FOR COMPANION-ASSISTED THERMAL / POWER MANAGEMENT

FIELD OF DISCLOSURE

The present disclosure is generally related to wireless communication between devices, including but not limited to, systems and methods for companion-assisted thermal or power management.

BACKGROUND

Augmented reality (AR), virtual reality (VR), and mixed reality (MR) are becoming more prevalent, which such technology being supported across a wider variety of platforms and device. Some AR/VR devices may be configured to leverage other user equipment (UE) for obtaining or receiving network data.

SUMMARY

Various aspects of the present disclosure are directed to systems, methods, and computer readable media for companion-assisted thermal or power management. Some devices, such as head wearable devices (HWDs) or other equipment (referred to as a primary device), may operate in a software-enabled access point (SoftAP) mode or peer-to-peer (P2P) mode to exchange (e.g., send and/or receive) large data files (such as software updates or other large packets) with a companion device. Such modes typically do not have any power saving schemes. Non-standard mechanisms typically have low-level cooperation between peer devices (e.g., the primary device and companion device). However, such low-level cooperation may not be feasible for the primary device, e.g., where the primary device and companion device are manufactured by different entities such that they execute on different operating systems or platforms. SoftAP mode or P2P mode thus is an advantageous deployment for providing large data file transfers between the peer devices. However, because such modes do not have power saving schemes, when the primary device is in a continuous transmission or reception mode to exchange such files, the primary device can quickly exceed thermal and power consumption thresholds.

According to the systems and methods described herein, a primary device (such as smart glasses/HWD/etc.) may determine (or be informed) that a large data packet or file is to be sent between the primary device and a companion device. The primary device may determine that the large data packet or file is to be transferred between the devices based on the companion device transmitting a Bluetooth message to the primary device indicating the large packet is ready for sending or receiving the file, and the primary device may for instance enter the SoftAP mode following which the companion device connects to the SoftAP of the primary device. The primary device may transmit device metrics, such as power and thermal levels, expected runtime, use case or context of the primary device, etc., to a companion application (also referred to internally as MWA application) executing on the companion device and/or the primary device. The companion application can operate to manage/control/pace the exchange of files/data between the primary and companion devices. The companion device can use the power and thermal levels to set or tune the transmission duty cycle. For example, where the companion device is the sender, the companion device can use the tuned transmission duty cycle to intermittently send the large data packet to the primary device. Similarly, where the companion device is the receiver, the companion device can use the tuned transmission duty cycle to cause the primary device to transmit the file according to the duty cycle.

The companion application can control and transmit smaller chunks of data or packets (where the size coincides with/within the size of the duty cycle) from the application layer to the queue according to the tuned duty cycle, to send (or receive) less data (e.g., at a lower data rate) to the primary device. The companion application can also run various simulations on scheduling processing of the data at the companion application-side, to determine an optimized schedule for processing and chunking the data for transmission between the primary device and companion device (e.g., transmission to the primary device and/or reception by the companion device from the primary device based on the duty cycle defined by the companion device for the primary device). In embodiments in which the primary device is the receiver, as the primary device receives the chunks, the primary device may write the chunks to storage until all chunks are received (at which time, the primary device writes from storage to RAM for processing). By writing the chunks to storage, the primary device can stagger processing of the individual chunks to give the primary device time to passively cool and can not permit the primary device to have power consumption exceed the maximum power capabilities of the device.

In one aspect, this disclosure is directed to a method. The method may include determining, by a first device, a duty cycle for transmitting a data file to a second device, the duty cycle determined according to metrics indicative of one or more device conditions of the first device or the second device. The method may include generating, by the first device, a plurality of data packets according to the duty cycle, each data packet including a respective portion of the data file. The method may include transmitting, by the first device to the second device, via a network maintained by one of the first device or the second device, each of the plurality of data packets at the determined duty cycle.

In some embodiments, the first device includes a companion application executing on the first device, the companion application receiving the metrics, determining the duty cycle, and generating the plurality of data packets. In some embodiments, determining the duty cycle includes receiving, by the first device, data indicative of the duty cycle from the second device, the second device determining the duty cycle according to the metrics indicative of the one or more device conditions of the first device. In some embodiments, the method includes receiving, by the first device, the data file for transmission to the second device, the data file received via a cellular connection from a base station. In some embodiments, the one or more device conditions includes at least one of a battery state or a thermal condition of the first device or the second device. In some embodiments, transmitting each of the plurality of data packets includes transmitting, by the first device, a first data packet of the plurality of data packets via the network to the second device, waiting, by the first device, a duration according to the determined duty cycle, and transmitting, by the first device, responsive to expiration of the duration, a second data packet of the plurality of data packets via the network to the second device.

In some embodiments, the second device maintains the plurality of data packets in a buffer until each of the plurality of data packets are received from the first device. In some embodiments, the method includes selecting, by the first device, a size of at least some of the plurality of data packets according to the metrics indicative of the one or more device conditions. In some embodiments, the method includes determining, by the first device, a first estimated change in the one or more device conditions according to a first duty cycle. The method may include determining, by the first device, a second estimated change in the one or more device conditions according to a second duty cycle. The method may include selecting, by the first device, the duty cycle from the first duty cycle and the second duty cycle, according to the first estimated change and the second estimated change. In some embodiments, the method includes transmitting, by the first device, a control message to the second device between transmitting one of the plurality of second data packets and another one of the plurality of data packets, the control message causing the second device to enter a sleep mode for a duration. In some embodiments, the network includes at least one of a software enabled access point (SoftAP) network or a peer-to-peer (P2P) network.

In another aspect, this disclosure is directed to a first device. The first device may include one or more processors configured to transmit, to a second device via a network maintained by the first device, metrics indicative of one or more device conditions of the first device. The one or more processors may be configured to receive, from the second device, a plurality of data packets at a duty cycle determined by the second device according to the one or more device conditions. The one or more processors may be configured to generate a data file using each of the plurality of first data packets, responsive to receiving each of the plurality of data packets.

In some embodiments, the one or more processors are configured to store each data packet of the plurality of data packets in a first storage device of the first device, as the respective data packet is received from the second device. The one or more processors may be configured to write the plurality of data packets from the first storage device to a second storage device of the first device responsive to each of the plurality of data packets being received. In some embodiments, the first storage device includes a buffer, and the second storage device includes a random access memory (RAM). In some embodiments, the network includes at least one of a software enabled access point (SoftAP) network or a peer-to-peer (P2P) network. In some embodiments, the one or more processors are configured to enter a sleep mode between receiving a first data packet of the plurality of data packets and a second data packet of the plurality of data packets. In some embodiments, the one or more device conditions include at least one of a battery state or a thermal condition of the second device. In some embodiments, each data packet of the plurality of data packets comprise a portion of a payload for the data file. In some embodiments, the one or more processors are configured to receive a control message from second device responsive to receiving a first data packet of the plurality of data packets and prior to receiving a second data packet of the plurality of data packets. The one or more processors may be configured to enter, responsive to receiving the control message, a sleep mode for a duration corresponding to the duty cycle.

In yet another aspect, this disclosure is directed to a first device. The first device may include one or more processors configured to determine a duty cycle for transmitting a data file to a second device, where the duty cycle is determined according to metrics indicative of one or more device conditions of the first device or the second device. The one or more processors may be configured to generate a plurality of data packets according to the duty cycle, each data packet including a portion of a payload of the data file. The one or more processors may be configured to transmit, to the second device, via a network maintained by one of the first device or the second device, each of the plurality of data packets at the determined duty cycle.

In some embodiments, the network maintained by the first device or the second device may include at least one of a software enabled access point (SoftAP) network or a peer-to-peer (P2P) network.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
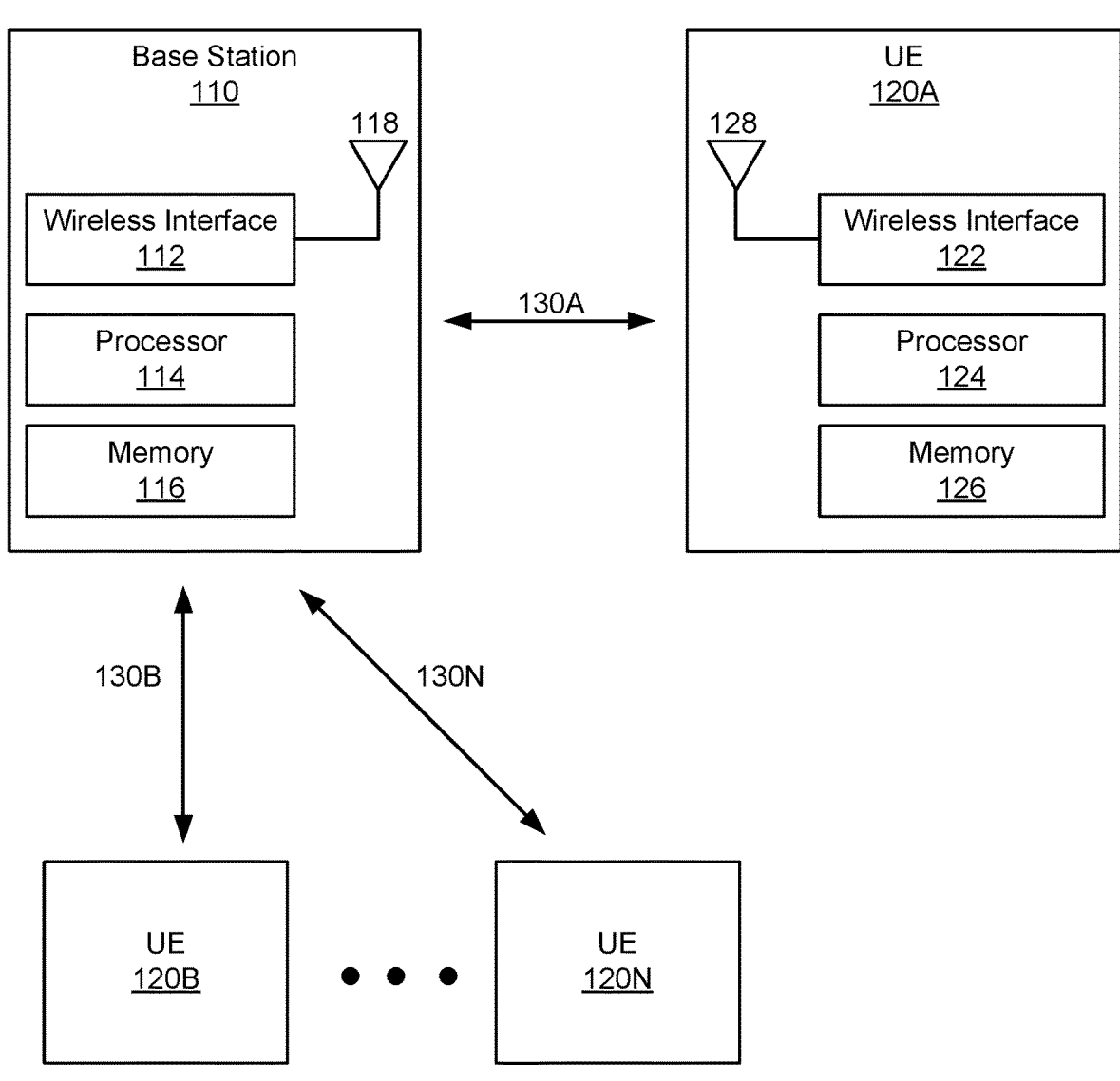
FIG. 1 is a diagram of an example wireless communication system, according to an example implementation of the present disclosure.

FIG. 1 illustrates an example wireless communication system 100. The wireless communication system 100 may include a base station 110 (also referred to as "a wireless communication node 110" or "a station 110") and one or more user equipment (UEs) 120 (also referred to as "wireless communication devices 120" or "terminal devices 120"). The base station 110 and the UEs 120 may communicate through wireless commination links 130A, 130B, 130C. The wireless communication link 130 may be a cellular communication link conforming to 3G, 4G, 5G or other cellular communication protocols or a Wi-Fi communication protocol. In one example, the wireless communication link 130 supports, employs or is based on an orthogonal frequency division multiple access (OFDMA). In one aspect, the UEs 120 are located within a geographical boundary with respect to the base station 110, and may communicate with or through the base station 110. In some embodiments, the wireless communication system 100 includes more, fewer, or different components than shown in FIG. 1. For example, the wireless communication system 100 may include one or more additional base stations 110 than shown in FIG. 1.

In some embodiments, the UE 120 may be a user device such as a mobile phone, a smart phone, a personal digital assistant (PDA), tablet, laptop computer, wearable computing device, etc. Each UE 120 may communicate with the base station 110 through a corresponding communication link 130. For example, the UE 120 may transmit data to a base station 110 through a wireless communication link 130, and receive data from the base station 110 through the wireless communication link 130. Example data may include audio data, image data, text, etc. Communication or transmission of data by the UE 120 to the base station 110 may be referred to as an uplink communication. Communication or reception of data by the UE 120 from the base station 110 may be referred to as a downlink communication. In some embodiments, the UE 120A includes a wireless interface 122, a processor 124, a memory device 126, and one or more antennas 128. These components may be embodied as hardware, software, firmware, or a combination thereof. In some embodiments, the UE 120A includes more, fewer, or different components than shown in FIG. 1. For example, the UE 120 may include an electronic display and/or an input device. For example, the UE 120 may include additional antennas 128 and wireless interfaces 122 than shown in FIG. 1.

The antenna 128 may be a component that receives a radio frequency (RF) signal and/or transmit a RF signal through a wireless medium. The RF signal may be at a frequency between 200 MHz to 100 GHz. The RF signal may have packets, symbols, or frames corresponding to data for communication. The antenna 128 may be a dipole antenna, a patch antenna, a ring antenna, or any suitable antenna for wireless communication. In one aspect, a single antenna 128 is utilized for both transmitting the RF signal and receiving the RF signal. In one aspect, different antennas 128 are utilized for transmitting the RF signal and receiving the RF signal. In one aspect, multiple antennas 128 are utilized to support multiple-in, multiple-out (MIMO) communication.

The wireless interface 122 includes or is embodied as a transceiver for transmitting and receiving RF signals through a wireless medium. The wireless interface 122 may communicate with a wireless interface 112 of the base station 110 through a wireless communication link 130A. In one configuration, the wireless interface 122 is coupled to one or more antennas 128. In one aspect, the wireless interface 122 may receive the RF signal at the RF frequency received through antenna 128, and downconvert the RF signal to a baseband frequency (e.g., 0~1 GHz). The wireless interface 122 may provide the downconverted signal to the processor 124. In one aspect, the wireless interface 122 may receive a baseband signal for transmission at a baseband frequency from the processor 124, and upconvert the baseband signal to generate a RF signal. The wireless interface 122 may transmit the RF signal through the antenna 128.

The processor 124 is a component that processes data. The processor 124 may be embodied as field programmable gate array (FPGA), application specific integrated circuit (ASIC), a logic circuit, etc. The processor 124 may obtain instructions from the memory device 126, and executes the instructions. In one aspect, the processor 124 may receive downconverted data at the baseband frequency from the wireless interface 122, and decode or process the downconverted data. For example, the processor 124 may generate audio data or image data according to the downconverted data, and present an audio indicated by the audio data and/or an image indicated by the image data to a user of the UE 120A. In one aspect, the processor 124 may generate or obtain data for transmission at the baseband frequency, and encode or process the data. For example, the processor 124 may encode or process image data or audio data at the baseband frequency, and provide the encoded or processed data to the wireless interface 122 for transmission.

The memory device 126 is a component that stores data. The memory device 126 may be embodied as random access memory (RAM), flash memory, read only memory (ROM), erasable programmable read-only memory (EPROM), electrically erasable programmable read-only memory (EEPROM), registers, a hard disk, a removable disk, a CD-ROM, or any device capable for storing data. The memory device 126 may be embodied as a non-transitory computer readable medium storing instructions executable by the processor 124 to perform various functions of the UE 120A disclosed herein. In some embodiments, the memory device 126 and the processor 124 are integrated as a single component.

In some embodiments, each of the UEs 120B . . . 120N includes similar components of the UE 120A to communicate with the base station 110. Thus, detailed description of duplicated portion thereof is omitted herein for the sake of brevity.

In some embodiments, the base station 110 may be an evolved node B (eNB), a serving eNB, a target eNB, a femto station, or a pico station. The base station 110 may be communicatively coupled to another base station 110 or other communication devices through a wireless communication link and/or a wired communication link. The base station 110 may receive data (or a RF signal) in an uplink communication from a UE 120. Additionally or alternatively, the base station 110 may provide data to another UE 120, another base station, or another communication device. Hence, the base station 110 allows communication among UEs 120 associated with the base station 110, or other UEs associated with different base stations. In some embodiments, the base station 110 includes a wireless interface 112, a processor 114, a memory device 116, and one or more antennas 118. These components may be embodied as hardware, software, firmware, or a combination thereof. In some embodiments, the base station 110 includes more, fewer, or different components than shown in FIG. 1. For example, the base station 110 may include an electronic display and/or an input device. For example, the base station 110 may include additional antennas 118 and wireless interfaces 112 than shown in FIG. 1.

The antenna 118 may be a component that receives a radio frequency (RF) signal and/or transmit a RF signal through a wireless medium. The antenna 118 may be a dipole antenna, a patch antenna, a ring antenna, or any suitable antenna for wireless communication. In one aspect, a single antenna 118 is utilized for both transmitting the RF signal and receiving the RF signal. In one aspect, different antennas 118 are utilized for transmitting the RF signal and receiving the RF signal. In one aspect, multiple antennas 118 are utilized to support multiple-in, multiple-out (MIMO) communication.

The wireless interface 112 includes or is embodied as a transceiver for transmitting and receiving RF signals through a wireless medium. The wireless interface 112 may communicate with a wireless interface 122 of the UE 120 through a wireless communication link 130. In one configuration, the wireless interface 112 is coupled to one or more antennas 118. In one aspect, the wireless interface 112 may receive the RF signal at the RF frequency received through antenna 118, and downconvert the RF signal to a baseband frequency (e.g., 0~1 GHz). The wireless interface 112 may provide the downconverted signal to the processor 124. In one aspect, the wireless interface 122 may receive a baseband signal for transmission at a baseband frequency from the processor 114, and upconvert the baseband signal to generate a RF signal. The wireless interface 112 may transmit the RF signal through the antenna 118.

The processor 114 is a component that processes data. The processor 114 may be embodied as FPGA, ASIC, a logic circuit, etc. The processor 114 may obtain instructions from the memory device 116, and executes the instructions. In one aspect, the processor 114 may receive downconverted data at the baseband frequency from the wireless interface 112, and decode or process the downconverted data. For example, the processor 114 may generate audio data or image data according to the downconverted data. In one aspect, the processor 114 may generate or obtain data for transmission at the baseband frequency, and encode or process the data. For example, the processor 114 may encode or process image data or audio data at the baseband frequency, and provide the encoded or processed data to the wireless interface 112 for transmission. In one aspect, the processor 114 may set, assign, schedule, or allocate communication resources for different UEs 120. For example, the processor 114 may set different modulation schemes, time slots, channels, frequency bands, etc. for UEs 120 to avoid interference. The processor 114 may generate data (or UL CGs) indicating configuration of communication resources, and provide the data (or UL CGs) to the wireless interface 112 for transmission to the UEs 120.

The memory device 116 is a component that stores data. The memory device 116 may be embodied as RAM, flash memory, ROM, EPROM, EEPROM, registers, a hard disk, a removable disk, a CD-ROM, or any device capable for storing data. The memory device 116 may be embodied as a non-transitory computer readable medium storing instructions executable by the processor 114 to perform various functions of the base station 110 disclosed herein. In some embodiments, the memory device 116 and the processor 114 are integrated as a single component.

In some embodiments, communication between the base station 110 and the UE 120 is based on one or more layers of Open Systems Interconnection (OSI) model. The OSI model may include layers including: a physical layer, a Medium Access Control (MAC) layer, a Radio Link Control (RLC) layer, a Packet Data Convergence Protocol (PDCP) layer, a Radio Resource Control (RRC) layer, a Non Access Stratum (NAS) layer or an Internet Protocol (IP) layer, and other layer.

Figure 2:
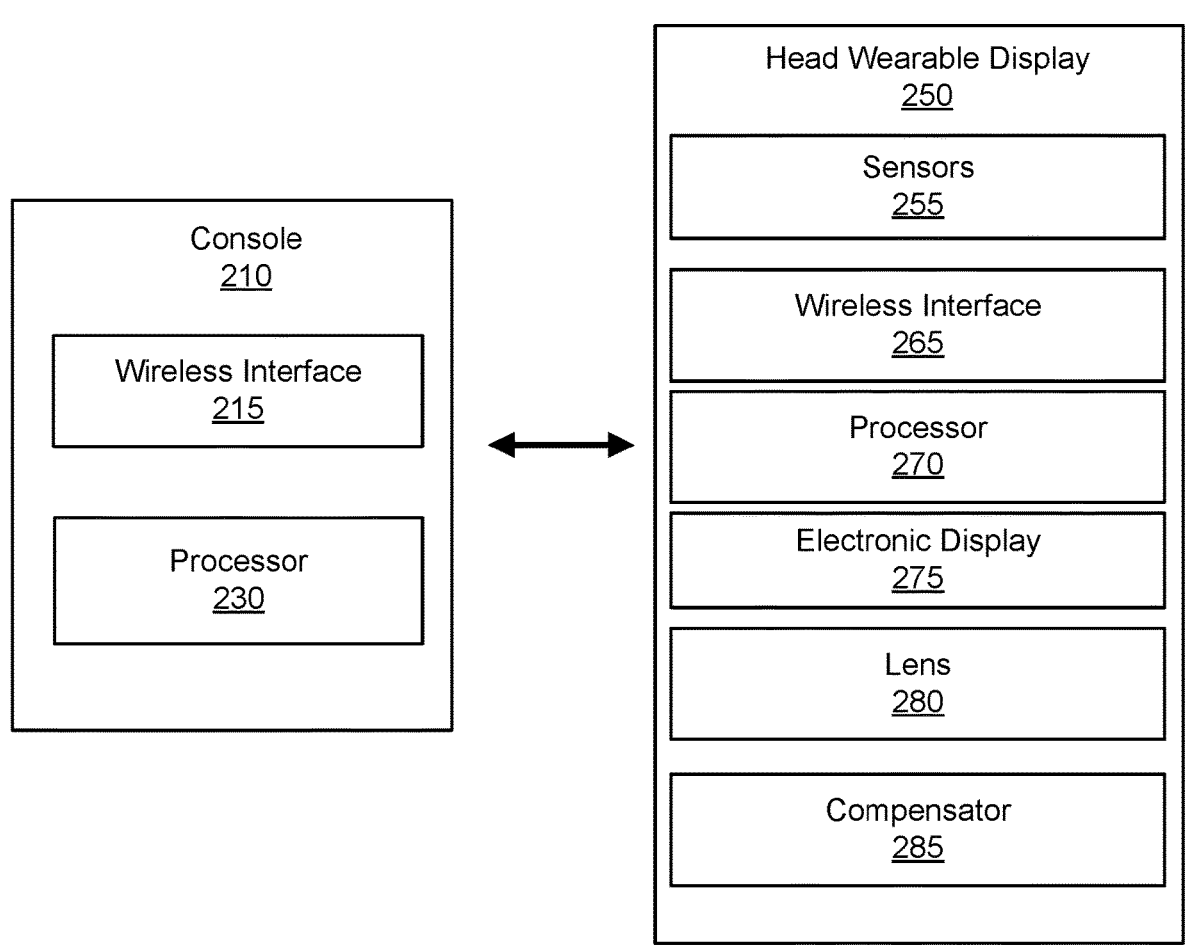
FIG. 2 is a diagram of a console and a head wearable display for presenting augmented reality or virtual reality, according to an example implementation of the present disclosure.

FIG. 2 is a block diagram of an example artificial reality system environment 200. In some embodiments, the artificial reality system environment 200 includes a HWD 250 worn by a user, and a console 210 providing content of artificial reality (e.g., augmented reality, virtual reality, mixed reality) to the HWD 250. Each of the HWD 250 and the console 210 may be a separate UE 120. The HWD 250 may be referred to as, include, or be part of a head mounted display (HMD), head mounted device (HMD), head wearable device (HWD), head worn display (HWD) or head worn device (HWD). The HWD 250 may detect its location and/or orientation of the HWD 250 as well as a shape, location, and/or an orientation of the body/hand/face of the user, and provide the detected location/or orientation of the HWD 250 and/or tracking information indicating the shape, location, and/or orientation of the body/hand/face to the console 210. The console 210 may generate image data indicating an image of the artificial reality according to the detected location and/or orientation of the HWD 250, the detected shape, location and/or orientation of the body/hand/face of the user, and/or a user input for the artificial reality, and transmit the image data to the HWD 250 for presentation. In some embodiments, the artificial reality system environment 200 includes more, fewer, or different components than shown in FIG. 2. In some embodiments, functionality of one or more components of the artificial reality system environment 200 can be distributed among the components in a different manner than is described here. For example, some of the functionality of the console 210 may be performed by the HWD 250. For example, some of the functionality of the HWD 250 may be performed by the console 210. In some embodiments, the console 210 is integrated as part of the HWD 250.

In some embodiments, the HWD 250 is an electronic component that can be worn by a user and can present or provide an artificial reality experience to the user. The HWD 250 may render one or more images, video, audio, or some combination thereof to provide the artificial reality experience to the user. In some embodiments, audio is presented via an external device (e.g., speakers and/or headphones) that receives audio information from the HWD 250, the console 210, or both, and presents audio based on the audio information. In some embodiments, the HWD 250 includes sensors 255, a wireless interface 265, a processor 270, an electronic display 275, a lens 280, and a compensator 285. These components may operate together to detect a location of the HWD 250 and a gaze direction of the user wearing the HWD 250, and render an image of a view within the artificial reality corresponding to the detected location and/ or orientation of the HWD 250. In other embodiments, the HWD 250 includes more, fewer, or different components than shown in FIG. 2.

In some embodiments, the sensors 255 include electronic components or a combination of electronic components and software components that detect a location and an orientation of the HWD 250. Examples of the sensors 255 can include: one or more imaging sensors, one or more accelerometers, one or more gyroscopes, one or more magnetometers, or another suitable type of sensor that detects motion and/or location. For example, one or more accelerometers can measure translational movement (e.g., forward/ back, up/down, left/right) and one or more gyroscopes can measure rotational movement (e.g., pitch, yaw, roll). In some embodiments, the sensors 255 detect the translational movement and the rotational movement, and determine an orientation and location of the HWD 250. In one aspect, the sensors 255 can detect the translational movement and the rotational movement with respect to a previous orientation and location of the HWD 250, and determine a new orientation and/or location of the HWD 250 by accumulating or integrating the detected translational movement and/or the rotational movement. Assuming for an example that the HWD 250 is oriented in a direction 25 degrees from a reference direction, in response to detecting that the HWD 250 has rotated 20 degrees, the sensors 255 may determine that the HWD 250 now faces or is oriented in a direction 45 degrees from the reference direction. Assuming for another example that the HWD 250 was located two feet away from a reference point in a first direction, in response to detecting that the HWD 250 has moved three feet in a second direction, the sensors 255 may determine that the HWD 250 is now located at a vector multiplication of the two feet in the first direction and the three feet in the second direction.

In some embodiments, the sensors 255 include eye trackers. The eye trackers may include electronic components or a combination of electronic components and software components that determine a gaze direction of the user of the HWD 250. In some embodiments, the HWD 250, the console 210 or a combination of them may incorporate the gaze direction of the user of the HWD 250 to generate image data for artificial reality. In some embodiments, the eye trackers include two eye trackers, where each eye tracker captures an image of a corresponding eye and determines a gaze direction of the eye. In one example, the eye tracker determines an angular rotation of the eye, a translation of the eye, a change in the torsion of the eye, and/or a change in shape of the eye, according to the captured image of the eye, and determines the relative gaze direction with respect to the HWD 250, according to the determined angular rotation, translation and the change in the torsion of the eye. In one approach, the eye tracker may shine or project a predetermined reference or structured pattern on a portion of the eye, and capture an image of the eye to analyze the pattern projected on the portion of the eye to determine a relative gaze direction of the eye with respect to the HWD 250. In some embodiments, the eye trackers incorporate the orientation of the HWD 250 and the relative gaze direction with respect to the HWD 250 to determine a gate direction of the user. Assuming for an example that the HWD 250 is oriented at a direction 30 degrees from a reference direction, and the relative gaze direction of the HWD 250 is −10 degrees (or 350 degrees) with respect to the HWD 250, the eye trackers may determine that the gaze direction of the user is 20 degrees from the reference direction. In some embodiments, a user of the HWD 250 can configure the HWD 250 (e.g., via user settings) to enable or disable the eye trackers. In some embodiments, a user of the HWD 250 is prompted to enable or disable the eye trackers.

In some embodiments, the wireless interface 265 includes an electronic component or a combination of an electronic component and a software component that communicates with the console 210. The wireless interface 265 may be or correspond to the wireless interface 122. The wireless interface 265 may communicate with a wireless interface 215 of the console 210 through a wireless communication link through the base station 110. Through the communication link, the wireless interface 265 may transmit to the console 210 data indicating the determined location and/or orientation of the HWD 250, and/or the determined gaze direction of the user. Moreover, through the communication link, the wireless interface 265 may receive from the console 210 image data indicating or corresponding to an image to be rendered and additional data associated with the image.

In some embodiments, the processor 270 includes an electronic component or a combination of an electronic component and a software component that generates one or more images for display, for example, according to a change in view of the space of the artificial reality. In some embodiments, the processor 270 is implemented as a part of the processor 124 or is communicatively coupled to the processor 124. In some embodiments, the processor 270 is implemented as a processor (or a graphical processing unit (GPU)) that executes instructions to perform various functions described herein. The processor 270 may receive, through the wireless interface 265, image data describing an image of artificial reality to be rendered and additional data associated with the image, and render the image to display through the electronic display 275. In some embodiments, the image data from the console 210 may be encoded, and the processor 270 may decode the image data to render the image. In some embodiments, the processor 270 receives, from the console 210 in additional data, object information indicating virtual objects in the artificial reality space and depth information indicating depth (or distances from the HWD 250) of the virtual objects. In one aspect, according to the image of the artificial reality, object information, depth information from the console 210, and/or updated sensor measurements from the sensors 255, the processor 270 may perform shading, reprojection, and/or blending to update the image of the artificial reality to correspond to the updated location and/or orientation of the HWD 250. Assuming that a user rotated his head after the initial sensor measurements, rather than recreating the entire image responsive to the updated sensor measurements, the processor 270 may generate a small portion (e.g., 10%) of an image corresponding to an updated view within the artificial reality according to the updated sensor measurements, and append the portion to the image in the image data from the console 210 through reprojection. The processor 270 may perform shading and/or blending on the appended edges. Hence, without recreating the image of the artificial reality according to the updated sensor measurements, the processor 270 can generate the image of the artificial reality.

In some embodiments, the electronic display 275 is an electronic component that displays an image. The electronic display 275 may, for example, be a liquid crystal display or an organic light emitting diode display. The electronic display 275 may be a transparent display that allows the user to see through. In some embodiments, when the HWD 250 is worn by a user, the electronic display 275 is located proximate (e.g., less than 3 inches) to the user's eyes. In one aspect, the electronic display 275 emits or projects light towards the user's eyes according to image generated by the processor 270.

In some embodiments, the lens 280 is a mechanical component that alters received light from the electronic display 275. The lens 280 may magnify the light from the electronic display 275, and correct for optical error associated with the light. The lens 280 may be a Fresnel lens, a convex lens, a concave lens, a filter, or any suitable optical component that alters the light from the electronic display 275. Through the lens 280, light from the electronic display 275 can reach the pupils, such that the user can see the image displayed by the electronic display 275, despite the close proximity of the electronic display 275 to the eyes.

In some embodiments, the compensator 285 includes an electronic component or a combination of an electronic component and a software component that performs compensation to compensate for any distortions or aberrations. In one aspect, the lens 280 introduces optical aberrations such as a chromatic aberration, a pin-cushion distortion, barrel distortion, etc. The compensator 285 may determine a compensation (e.g., predistortion) to apply to the image to be rendered from the processor 270 to compensate for the distortions caused by the lens 280, and apply the determined compensation to the image from the processor 270. The compensator 285 may provide the predistorted image to the electronic display 275.

In some embodiments, the console 210 is an electronic component or a combination of an electronic component and a software component that provides content to be rendered to the HWD 250. In one aspect, the console 210 includes a wireless interface 215 and a processor 230. These components may operate together to determine a view (e.g., a FOV of the user) of the artificial reality corresponding to the location of the HWD 250 and the gaze direction of the user of the HWD 250, and can generate image data indicating an image of the artificial reality corresponding to the determined view. In addition, these components may operate together to generate additional data associated with the image. Additional data may be information associated with presenting or rendering the artificial reality other than the image of the artificial reality. Examples of additional data include, hand model data, mapping information for translating a location and an orientation of the HWD 250 in a physical space into a virtual space (or simultaneous localization and mapping (SLAM) data), eye tracking data, motion vector information, depth information, edge information, object information, etc. The console 210 may provide the image data and the additional data to the HWD 250 for presentation of the artificial reality. In other embodiments, the console 210 includes more, fewer, or different components than shown in FIG. 2. In some embodiments, the console 210 is integrated as part of the HWD 250.

In some embodiments, the wireless interface 215 is an electronic component or a combination of an electronic component and a software component that communicates with the HWD 250. The wireless interface 215 may be or correspond to the wireless interface 122. The wireless interface 215 may be a counterpart component to the wireless interface 265 to communicate through a communication link (e.g., wireless communication link). Through the communication link, the wireless interface 215 may receive from the HWD 250 data indicating the determined location and/or orientation of the HWD 250, and/or the determined gaze direction of the user. Moreover, through the communication link, the wireless interface 215 may transmit to the HWD 250 image data describing an image to be rendered and additional data associated with the image of the artificial reality.

The processor 230 can include or correspond to a component that generates content to be rendered according to the location and/or orientation of the HWD 250. In some embodiments, the processor 230 is implemented as a part of the processor 124 or is communicatively coupled to the processor 124. In some embodiments, the processor 230 may incorporate the gaze direction of the user of the HWD 250. In one aspect, the processor 230 determines a view of the artificial reality according to the location and/or orientation of the HWD 250. For example, the processor 230 maps the location of the HWD 250 in a physical space to a location within an artificial reality space, and determines a view of the artificial reality space along a direction corresponding to the mapped orientation from the mapped location in the artificial reality space. The processor 230 may generate image data describing an image of the determined view of the artificial reality space, and transmit the image data to the HWD 250 through the wireless interface 215. In some embodiments, the processor 230 may generate additional data including motion vector information, depth information, edge information, object information, hand model data, etc., associated with the image, and transmit the additional data together with the image data to the HWD 250 through the wireless interface 215. The processor 230 may encode the image data describing the image, and can transmit the encoded data to the HWD 250. In some embodiments, the processor 230 generates and provides the image data to the HWD 250 periodically (e.g., every 11 ms).

In one aspect, the process of detecting the location of the HWD 250 and the gaze direction of the user wearing the HWD 250, and rendering the image to the user should be performed within a frame time (e.g., 11 ms or 16 ms). A latency between a movement of the user wearing the HWD 250 and an image displayed corresponding to the user movement can cause judder, which may result in motion sickness and can degrade the user experience. In one aspect, the HWD 250 and the console 210 can prioritize communication for AR/VR, such that the latency between the movement of the user wearing the HWD 250 and the image displayed corresponding to the user movement can be presented within the frame time (e.g., 11 ms or 16 ms) to provide a seamless experience.

Figure 3:
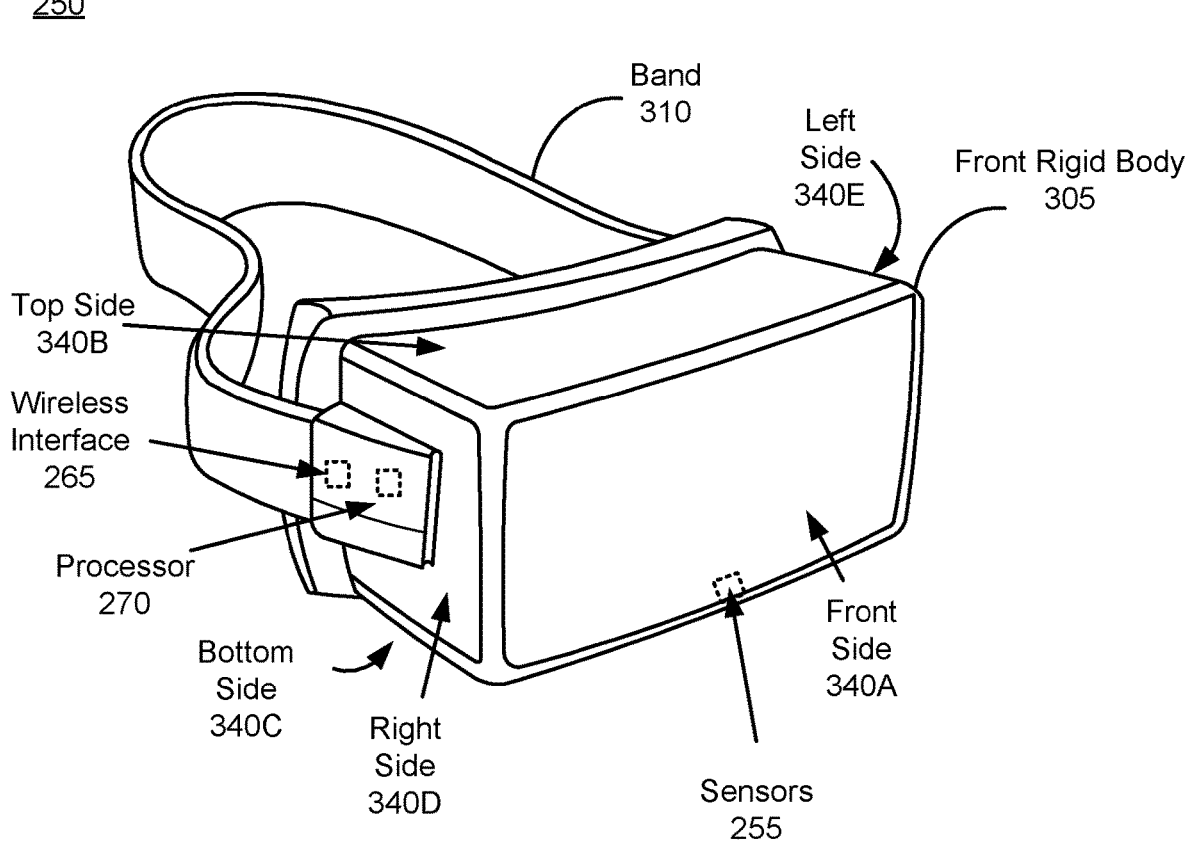
FIG. 3 is a diagram of a head wearable display, according to an example implementation of the present disclosure.

FIG. 3 is a diagram of a HWD 250, in accordance with an example embodiment. In some embodiments, the HWD 250 includes a front rigid body 305 and a band 310. The front rigid body 305 includes the electronic display 275 (not shown in FIG. 3), the lens 280 (not shown in FIG. 3), the sensors 255, the wireless interface 265, and the processor 270. In the embodiment shown by FIG. 3, the wireless interface 265, the processor 270, and the sensors 255 are located within the front rigid body 205, and may not be visible externally. In other embodiments, the HWD 250 has a different configuration than shown in FIG. 3. For example, the wireless interface 265, the processor 270, and/or the sensors 255 may be in different locations than shown in FIG. 3.

Figure 4:
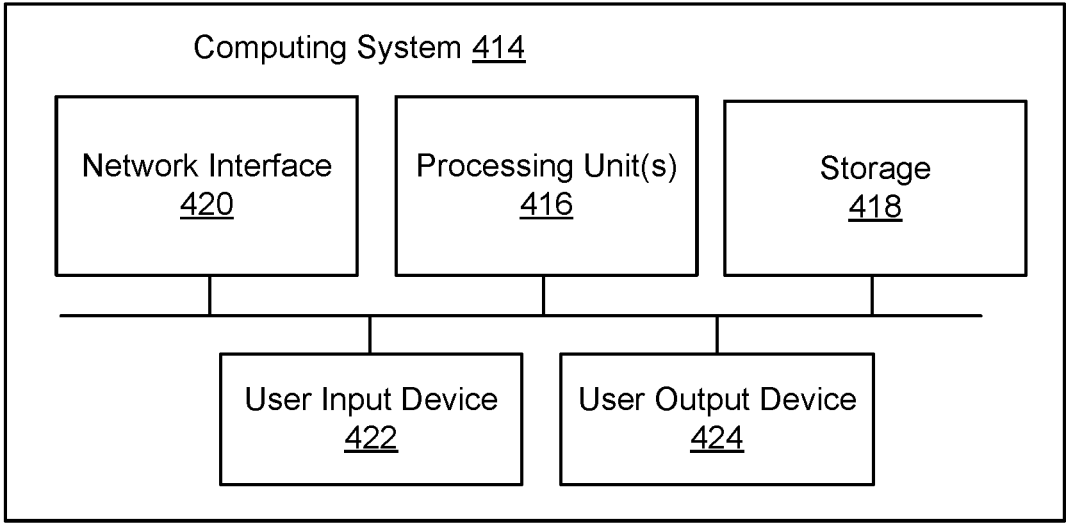
FIG. 4 is a block diagram of a computing environment according to an example implementation of the present disclosure.

Various operations described herein can be implemented on computer systems. FIG. 4 shows a block diagram of a representative computing system 414 usable to implement the present disclosure. In some embodiments, the source devices 110, the sink device 120, the console 210, the HWD 250 are implemented by the computing system 414. Computing system 414 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 414 can be implemented to provide VR, AR, MR experience. In some embodiments, the computing system 414 can include conventional computer components such as processors 416, storage device 418, network interface 420, user input device 422, and user output device 424.

Network interface 420 can provide a connection to a wide area network (e.g., the Internet) to which WAN interface of a remote server system is also connected. Network interface 420 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

The network interface 420 may include a transceiver to allow the computing system 414 to transmit and receive data from a remote device using a transmitter and receiver. The transceiver may be configured to support transmission/reception supporting industry standards that enables bi-directional communication. An antenna may be attached to transceiver housing and electrically coupled to the transceiver. Additionally or alternatively, a multi-antenna array may be electrically coupled to the transceiver such that a plurality of beams pointing in distinct directions may facilitate in transmitting and/or receiving data.

A transmitter may be configured to wirelessly transmit frames, slots, or symbols generated by the processor unit 416. Similarly, a receiver may be configured to receive frames, slots or symbols and the processor unit 416 may be configured to process the frames. For example, the processor unit 416 can be configured to determine a type of frame and to process the frame and/or fields of the frame accordingly.

User input device 422 can include any device (or devices) via which a user can provide signals to computing system 414; computing system 414 can interpret the signals as indicative of particular user requests or information. User input device 422 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 424 can include any device via which computing system 414 can provide information to a user. For example, user output device 424 can include a display to display images generated by or delivered to computing system 414. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 424 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 416 can provide various functionality for computing system 414, including any of the functionality described herein as being performed by a server or client, or other functionality associated with message management services.

It will be appreciated that computing system 414 is illustrative and that variations and modifications are possible. Computer systems used in connection with the present disclosure can have other capabilities not specifically described here. Further, while computing system 414 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Figure 5:
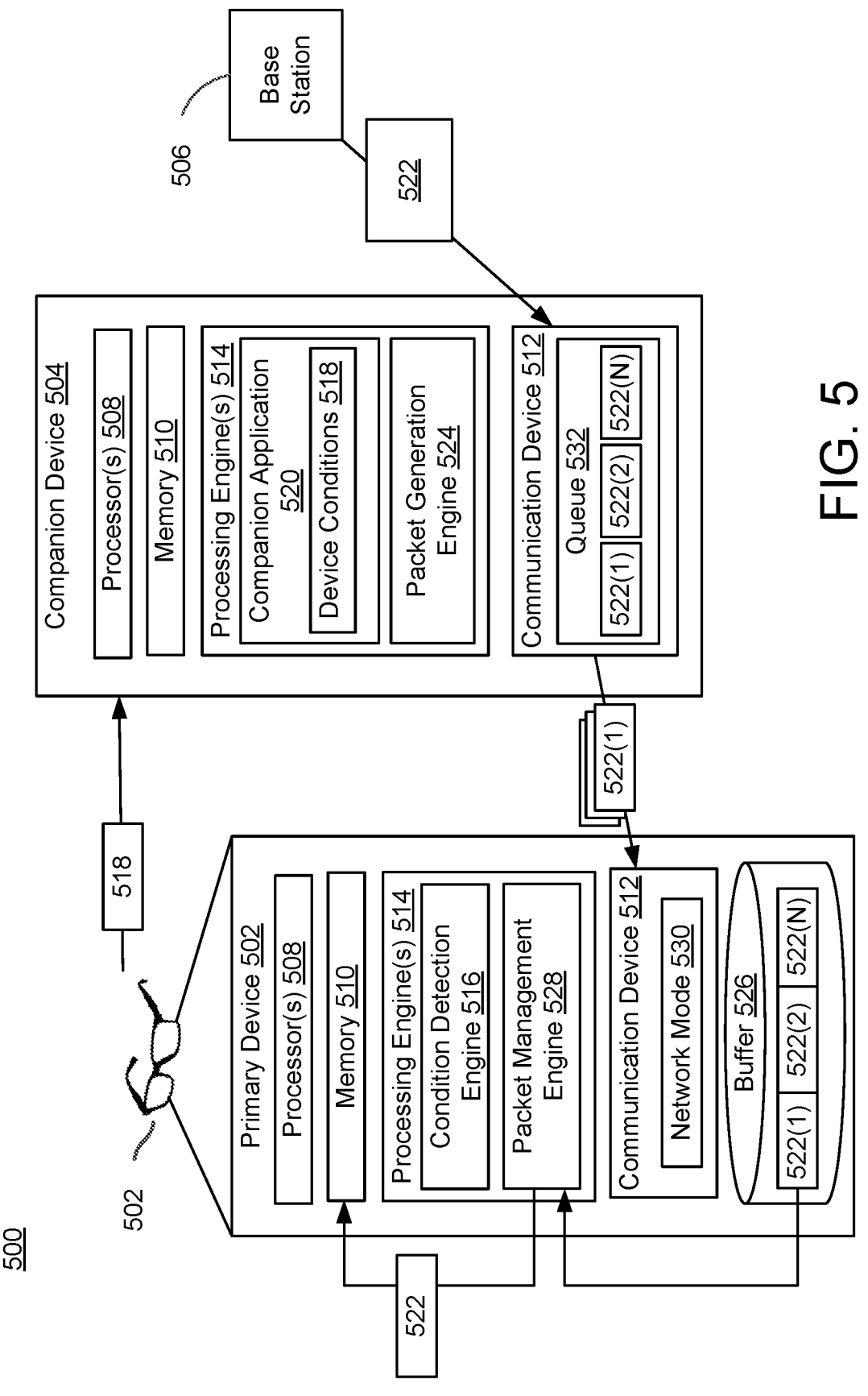
FIG. 5 is a block diagram of a system for companion-assisted thermal and/or power management, according to an example implementation of the present disclosure.
Figure 6:
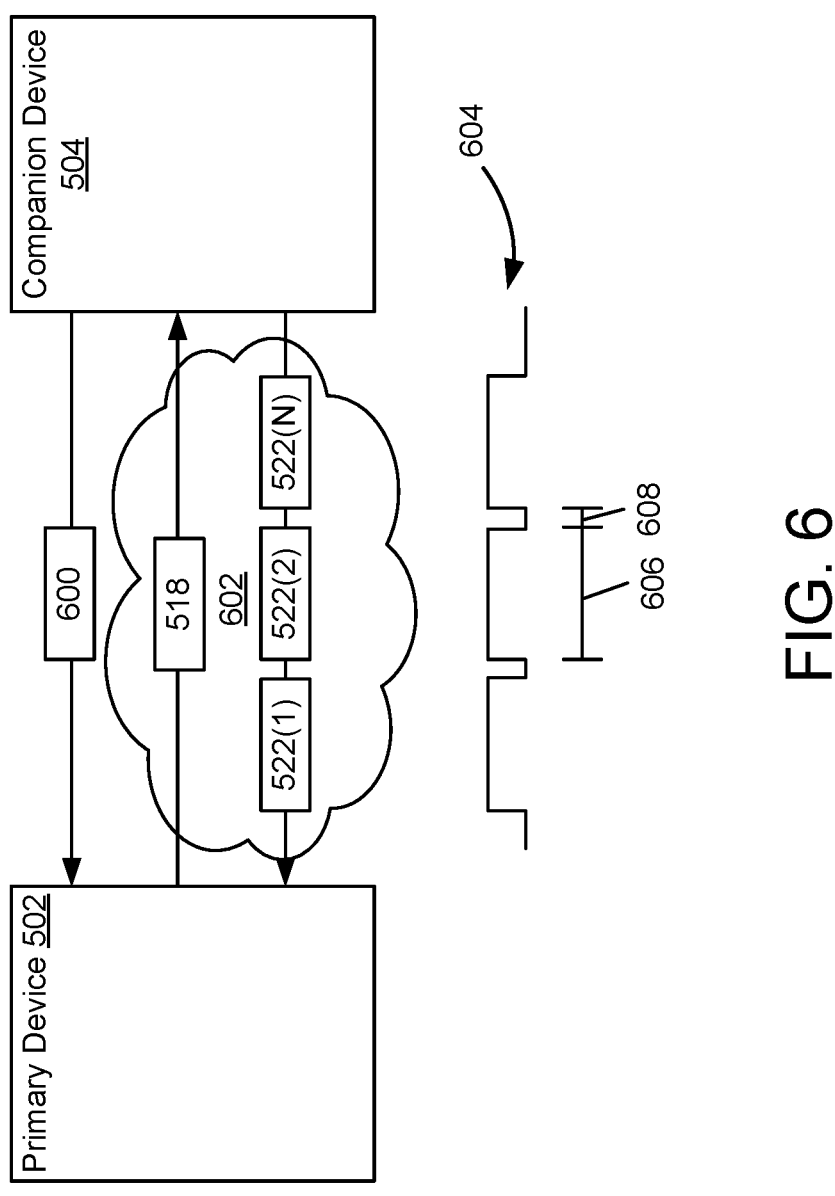
FIG. 6 is a block diagram of the system of FIG. 5 during transmission of a data file, according to an example implementation of the present disclosure.

Referring now to FIG. 5 and FIG. 6, depicted is a block diagram of a system 500 for companion-assisted thermal and/or power management and a block diagram of the system 500 during data processing and/or communication (e.g., transmission of a data file 522), respectively, according to an example implementation of the present disclosure. The system 500 may include a primary device 502, a companion device 504, and/or a base station 506. As described in greater detail below, the companion device 504 may be configured to receive a data packet 522, such as an over the air (OTA) update file, from the base station 110. The data packet 522 may be destined for the primary device 502. The companion device 504 may be configured to provide a signal or indication to the primary device 502, that the companion device 504 received the data packet 522 for the primary device 504. The primary device 504 may be configured to switch to a network mode 530 (e.g., soft-AP or hotspot mode), to provide a network to which the companion device 504 can connect. The companion device 504 may be configured to connect to the network supplied by the primary device 504. The primary device 504 may be configured to transmit metrics 518 of the primary device 504 to a companion application 520 (e.g., executing on the companion device) on the network. The companion application 520 may be configured to determine/optimize a duty cycle for transmitting the data packet 522 to the primary device 502 according to the metrics(s) 518 of the primary device 504, e.g., to meet thermal and/or power thresholds or requirements. The companion device 504 may be configured to generate second data packets 522(1)-522(N) based on the data packet 522, according to the duty cycle. The companion device 504 may be configured to transmit the second data packets 522(1)-522(N) via the network to the primary device 402 at the determined duty cycle.

The primary device 502, companion device 504, and base station 506 may be similar to the devices, components, elements, and hardware described above with reference to FIG. 1-FIG. 4. For example, the primary device 502 may be a head-wearable device (HWD), similar to the HWD 250 of FIG. 2 and FIG. 3. The companion device 504 may be a user device or user equipment (UE), similar to the UE 120 described above with reference to FIG. 1. For example, the companion device 504 may be or include a smartphone, a mobile device, or other mobile communication device. The base station 506 may be similar to the base station 110 described above with reference to FIG. 1. The primary device 502 and companion device 504 may include respective processor(s) 508, memory 510, and communication devices 512. The processor(s) 508 may be similar to processor 230, 270 described above with reference to FIG. 2 and/or the processing unit(s) 416 described above with reference to FIG. 4. The memory 510 may be similar to storage 418 described above with reference to FIG. 4. The communication devices 512 may be similar to the wireless interface 215, 265 described above with reference to FIG. 2 and/or the network interface 420 described above with reference to FIG. 2.

The primary device 502 and companion device 504 may include respective processing engines 514. The processing engines 514 may be or include any device, component, element, or hardware designed or configured to perform various functions of the respective devices. For example, the primary device 502 may include a condition detection engine 516 and/or a packet management engine 528, and the companion device 504 may include a companion application 520 and/or a packet generation engine 524. The condition detection engine 516 may be configured to detect, quantify, compute, evaluate, or otherwise determine (and transmit, report, or otherwise provide to the companion device 504) metrics indicative of various device conditions of the primary device 502. The companion application 520 may be configured to receive and identify the metrics of the primary device 502, and determine a duty cycle for exchanging a data packet 522 with the primary device 502. The packet generation engine 524 may be configured to generate a plurality of data packets 522(1)-522(N) from the data packet 522 according to the determined duty cycle for transmitting the data packet. The primary device 502 may include a buffer 524. The buffer 524 may be or include temporary storage of the primary device 502. The buffer 524 may be similar to and/or a component of the memory 510. For example, the buffer 524 may be temporary memory of the memory 510 (which itself may be a random access memory (RAM) of the primary device 502).

It is noted that, while primarily described herein as transmitting a data file or data packet 522 from the companion device 504 to the primary device 502, in various embodiments, the systems and methods described herein may be used for transmitting data files or packets 522 from the primary device 502 to the companion device 504. For example, and as described variously herein, the primary device 502 may be configured to signal to the companion device 504 that the primary device 502 intends to send a data packet 522 to the companion device 504. The primary device 502 and companion device 504 may be configured to switch to a network maintained by the companion device 504 (or primary device 502). The companion application 520 may be configured to determine the duty cycle for the companion device 504 to transmit the data packet 522 to the companion device 504. The companion application 520 may be configured to transmit the duty cycle to the companion device 504. The primary device 502 may be configured to generate the data packets 522(1)-522(N) according to the duty cycle, and transmit the data packets 522(1)-522(N) to the companion device 504 according to the duty cycle. As such, the present disclosure is not limited to either arrangement (e.g., where the companion device 504 is the transmitting device and primary device 502 is the receiving device, and/or where the companion device 504 is the receiving device and the primary device 502 is the transmitting device). In some embodiments, an application (similar to and/or interoperating with the companion application) may execute on the primary device, and can perform one or more operations similar to the companion application but from the context of the primary device.

In some embodiments, the companion device 504 may be configured to identify, determine, or otherwise detect a new data file 522 for the primary device 502. For example, the companion application 520 may receive a push notification from an update service corresponding to the primary device 502. The update service may be a remote service maintained by a provider or manufacturer of the primary device 502. The update service may push/send/direct a notification to the companion application indicating availability of a data file 522 for the primary device 502. The data file 522 may be an over-the-air (OTA) update file for the primary device 502. While described as an OTA update file, it is noted that any large data file may be sent from the network via the base station 506 (which can be a WLAN access point or a cellular base station for instance) to the companion device 504. Similarly, and in various embodiments, the companion application 520 may be configured to routinely poll the update service for any new data files.

The companion device 504 may be configured to request and receive the data file 522 from the network via the base station 506. The companion device 504 may be configured to connect to the base station 506 via the communication device 512 to receive the data file 522. The connection between the base station 506 and communication device 512 of the companion device 504 may be or include a cellular connection, such as a LTE/5G/6G/60 GHz connection, a WI-FI/WLAN/cable/optical-network/other connection via various routers and/or network nodes to the base station 506, etc. The companion device 504 may be configured to receive the data file 522 and can write the data file to the memory 510.

In some embodiments, the primary device 502 may be configured to determine, identify, and/or detect a data file 522 for transmission to the companion device 504. The primary device 502 may be configured to detect the data packet or file 522 for transmission to the companion device 504 responsive to the primary device 502 generating the data file 522, the data file 522 being queued (e.g., by the primary device 502) for transmission to the companion device 504, etc. The data file 522 may thus be or include a data packet or file 522 generated and/or received by the companion device 504 for transmission to the primary device 504.

The companion application 520 may be configured to transmit, send, or otherwise provide a notification 600 to the primary device 502 indicating availability of the data file 522 for transmission to the primary device 502. The notification may include, for example, a file size of the data file 522, an identifier of the file (e.g., file name, file type, etc.), a version number, etc. The companion application 520 may be configured to provide the notification 600 to the primary device 502 via the respective communication devices 512 of the devices 502, 504. For example, the companion application 520 may be configured to push the notification 600 to the primary device 502 via a BLUETOOTH stack of the communication device 512 on the companion device 504, for receipt via a corresponding BLUETOOTH stack of the communication device 512 on the primary device 502. The primary device 502 may be configured to receive the notification 600 from the companion device 504 indicating availability of the data file 522 for receipt by the primary device 502. Similarly, and in various embodiments, the primary device 502 may be configured to transmit, send, or otherwise provide a notification 600 to the companion device 504 indicating availability of the data file 522 for transmission to the companion device 504.

Referring now to FIG. 5 and FIG. 6, the communication device 512 of the primary device 502 may be configured to switch to, enable, or otherwise enter a network mode 530, to provide a network 602 to which the companion device 504 can connect for transmitting the data file 522 to the primary device 502. The primary device 502 may be configured to enter the network mode 530 responsive to receiving the notification 600 from the companion device 504. The network 602 provided responsive to entering the network mode 530 may be or include a software-enabled access point (SoftAP) network, a peer-to-peer (P2P) network, or other personal area network (PAN). In other words, the network mode 530 may be or include a SoftAP mode, a P2P mode, etc. The companion device 504 may be configured to establish a connection to the network 600 provided by the primary device 502 responsive to the network being available (e.g., responsive to the communication device 512 providing the SoftAP network/P2P network). While stated as the network 600 being maintained or provided by the primary device 502, in various embodiments, the network 600 may additionally or alternatively be provided by the companion device 504.

The condition detection engine 516 may be configured to detect, identify, quantify, sense, measure, or otherwise determine one or more metrics 518 indicative of a device condition of the primary device 502. The condition detection engine 516 may be configured to determine the metrics 518 based on or according to one or more sensor measurements from various sensor(s) of the primary device 502. The device conditions may include thermal and/or power conditions of the primary device 502. For example, the thermal conditions may be or include a current temperature of a battery or of the device 502, a rate of change in the temperature or thermal output of the device 502, etc. The power conditions may be or include a battery level, a state of charge, a rate of change in the battery level, etc. The device conditions may include an expected runtime associated with the primary device 502. The condition detection engine 516 may be configured to determine the expected runtime based on or according to a reported runtime from a runtime system of the primary device 502. The runtime may be or include a compile (e.g., processing, encoding, compression, encryption) runtime corresponding to a file size of the data file 522. For example, the runtime system may simulate an expected compile time for the data file based on or according to the file size from, included in, or identified in the notification 600 from the companion device 504. The device conditions may include a use case or context of the primary device 502. The condition detection engine 516 may be configured to determine the use case or context based on current applications executing on the primary device 502, a current RAM usage or processor 508 usage, etc.

The condition detection engine 516 may be configured to determine the metric(s) 518 upon/responsive to the primary device 502 switching to the network mode 530 and/or at various intervals while the primary device 502 is in the network mode 530. The condition detection engine 516 may be configured to transmit, send, communicate, or otherwise provide the metric(s) 518 to the companion device 504. The condition detection engine 516 may be configured to provide the metric(s) 518 via a connection of the network 602 provided by the primary device 502 to the companion device 504. For example, the condition detection engine 516 may be configured to provide the metric(s) 518 to the companion device 504 via a connection on the SoftAP network/P2P network/PAN, etc.

The companion device 504 may be configured to receive the metric(s) 518 from the primary device 502. The companion device 504 may be configured to receive the metric(s) 518 via the connection on the network 602 from the primary device 502. The companion application 520 may be configured to receive the metrics 518 via the communication device 512 from the primary device 502. The companion application 520 may be configured to use the metric(s) 518 to identify, calculate, compute, or otherwise determine a transmission rate or pattern (e.g., active transmission cycle, data rate, throttle rate, duty cycle 604) for transmitting the data file 522 to the primary device 502, for example as described in greater detail below.

The companion application 520 may be configured to simulate, estimate, or otherwise determine a change in the device condition(s) of the primary device 502 according to various transmission rates or patterns, or duty cycles 604 in which to transmit the data file 522 to the primary device 502. For example, the companion application 520 may be configured to simulate a first change in device condition(s) according to a first duty cycle 604, a second change in device condition(s) according to a second duty cycle 604, etc. The companion application 520 may be configured to simulate the change in device condition(s) using a profile corresponding to the primary device 502 and the metrics 518 from the primary device 502. The profile may include, for example, memory capacity, available processing resources, maximum power threshold, etc. The companion application 520 may be configured to apply the profile, metrics 518, and different duty cycles 604 to a simulation algorithm of the companion application 520 to determine estimated changes in the device condition at the respective transmission rates or patterns, or duty cycles 604. The companion application 520 may be configured to select a duty cycle 604 for instance according to the estimated change in the device conditions. For example, the companion application 520 may be configured to select a duty cycle 604 having the least impact on the device conditions (e.g., least change in thermal condition, least amount of power consumption, least amount of computational resources consumed by the device 502, etc.).

In some embodiments, the companion application 520 may be configured to simulate the change in device conditions based on or using as seed a dataset corresponding to various inputs or variables of the metrics received from the primary device 504. For example, the companion application may be configured to use, as seed for simulating the change in device conditions, a dataset corresponding to observed causal behavior and relationships between the multitude of independent variables. The independent variables may include, but are not limited to, transmission rates, duration, patterns, spacing between transmission duration, arrangement and sequencing of aforementioned with other observed I/O, compute activities. The independent variables may be simulated or determined in a controlled experiment and multitude of dependent variables of interest including but not limited to power consumption, thermal behavior, latency for a particular use case of interest etc. The companion application 520 may be configured to refine the seed dataset based on observed behavior in real world scenarios by capturing additional available independent variables (e.g., received from the primary device 502 and/or measured by the companion device 504) which may not have been part of initial seed dataset. The companion application 520 may be configured to conduct hypothesis testing to establish causality amongst independent and dependent variables (e.g., to discover additional numerous independent variables for creating a new generation of a dataset with augmented independent variables). The companion application 520 may be configured to use the most recent generation/iteration of a dataset for estimating the change in device conditions (or other primary device behavior) with respect to dependent variables of interest, validation/invalidation of hypothesis for a selected duty cycle and/or for further refining the accuracy of a particular generation of dataset.

The packet generation engine 524 may be configured to create, split, determine, derive, or otherwise generate a plurality of data packets 522 based on or using the data file 522. While illustrated as being located on the companion device 504, it is noted that, in various embodiments (such as where the primary device 502 is the transmitting device and the companion device 504 is the receiving the device), the primary device 502 may include the same or similar packet generation engine 524. The packet generation engine 524 may be configured generate the plurality of data packets 522(1)-522(N) according to the selected transmission rate or pattern, or duty cycle 604 for transmitting the data file 522 to the primary device 502 (or companion device 504). The packet generation engine 524 may be configured to select a maximum size for each of the data packets 522(1)-522(N) according to the selected duty cycle 604 for instance. As shown in FIG. 6, the duty cycle 604 may include a high period or duration 606 and a low period or duration 608. The packet generation engine 524 may be configured to select the maximum size for each data packet 522(1)-522(N) according to a transmission rate for the connection on the network 602 and the duration of the high period. The packet generation engine 524 may be configured to generate each of the plurality of data packets 522(1)-522(N) by splitting a payload of the data file 522 into portions which are less than or equal to the maximum size of the data packets 522(1)-522(N). For example, the packet generation engine 524 may be configured to split the payload into equal portions which are less than or equal to the maximum size of the data packets 522(1)-522(N). As another example, the packet generation engine 524 may be configured to split the payload into unequal portions (e.g., first packet 522(1) through N–1 packets 522(N–1) each having the maximum payload size, with the N-th packet 522(N) having the remaining payload).

The packet generation engine 524 may be configured to store, maintain, or otherwise communicate the generated packets 522(1)-522(N) to a queue 532 of the communication device 512. The packet generation engine 524 may be configured to write the packets 522(1)-522(N) to the queue 532 for transmission to the primary device 502 (or companion device 504) according to the determined or selected transmission rate or pattern, or duty cycle 604.

In embodiments in which the companion device 504 is the transmitting device, the communication device 512 of the companion device 504 may be configured to send, share, communicate, or otherwise transmit the data packets 522 (1)-522(N) from the queue 532 to the primary device 502 at the transmission rate or pattern, or duty cycle 604. The communication device 512 may be configured to transmit the data packets 522(1)-522(N) to the primary device 502 on a connection of the network 602 provided by the primary device 502. In some embodiments, the communication device 512 may be configured to transmit a first data packet 522(1) via the network to the primary device 502 (e.g., during the on duration 606 of the duty cycle 604), then wait a duration corresponding to the off duration of the duty cycle 604, transmit (e.g., responsive to expiration of the duration) a second data packet 522(2) via the network during a subsequent on duration 606, and so forth until each of the data packets 522(1)-522(N) are transmitted to the primary device 502. By waiting (e.g., being partially inactive) over/ during the duration corresponding to the off period, the primary device 502 may passively cool by not being in a continuous reception mode for the full duration to receive the data file 522 altogether. Similarly, in embodiments in which the companion device 504 is the receiving device, the communication device 512 of the primary device 504 may be configured to send, share, communicate, or otherwise transmit the data packets 522(1)-522(N) from the queue to the companion device 504 at the transmission rate, or pattern, or duty cycle 604.

The communication device 512 may be configured to receive the packets 522(1)-522(N) from the companion device 504 (or primary device 502). In some embodiments, the packet management engine 528 may be configured to retrieve the packets 522(1)-522(N) received via the communication device 512, and move, transmit, or otherwise write the packet(s) 522(1)-522(N) to the buffer 526. The packet management engine 528 may write the packets 522(1)-522(N) to the buffer to avoid performing any processing of the packets 522(1)-522(N) as they are received. By avoiding processing of the packets 522(1)-522(N) as the packets 522(1)-522(N) are received, the primary device 502 may not exceed thermal and power thresholds (e.g., by avoiding simultaneously executing the processor(s) 508 while the communication device 512 is continuously receiving the data packets 522(1)-522(N)).

In some embodiments, the communication device 512 may be configured to transmit, send, or otherwise provide a control message to the primary device 502 between on and off durations 606, 608 of the duty cycle 604. The communication device 512 may be configured to provide the control message to the primary device 502 as a session layer (e.g., L3) control message, a transport layer (e.g., L4) control message, etc. In some embodiments, the communication device 512 may be configured to provide the control message to the primary device 502 on a connection of the network 604. In some embodiments, the communication device 512 may be configured to provide the control message on a separate connection outside of the network 604 (e.g., similar to the notification 600 indicating availability of the data file 522). The control message may instruct, prompt, or otherwise cause the primary device 502 to enter a sleep mode for the off duration 608. The primary device 502, upon receiving the control message, may inactivate, disconnect, or otherwise disable the connection between the primary and companion devices 502, 504. Such implementations may also provide the primary device 502 with passive cooling opportunities by entering an idle or sleep mode for the off duration 608.

Figure 7:
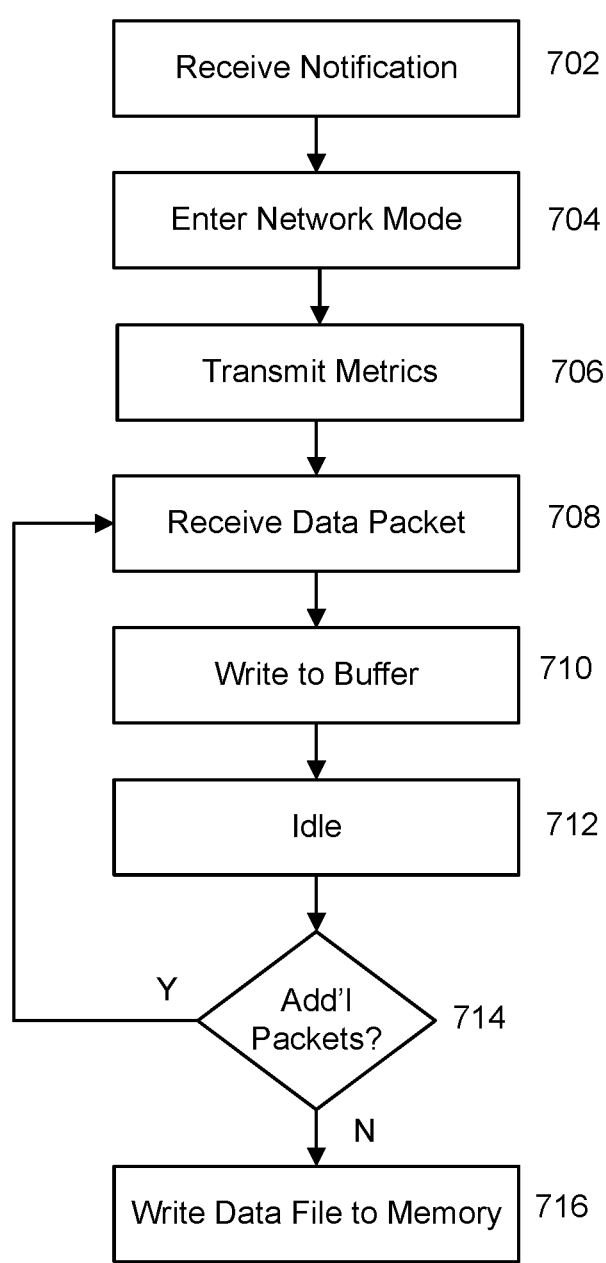
FIG. 7 is a flow chart showing an example method of receiving a data file from a companion device, according to an example implementation of the present disclosure.

Once the communication device 512 receives each of the plurality of data packets 522(1)-522(N), the packet management engine 528 may be configured to generate, recreate, reproduce, reconstruct, or otherwise provide the data file 522 using the plurality of data packets 522(1)-522(N). For example, the packet management engine 528 may be configured to pull each of the data packets 522(1)-522(N) from the buffer 526 and can generate the data file 522 using the payload of the data packets 522(1)-522(N). The packet management engine 528 may be configured to write the data file 522 to the memory 510 for processing and execution by the processor(s) 508. In other words, the packet management engine 528 may be configured to write the packets 522(1)-522(N) from the buffer 526 to the memory 510 (e.g., RAM) for the processor(s) 508 to execute the data file 522. Where the data file 522 corresponds to an OTA update data file 522, the processor(s) 508 may be configured to execute the data file 522 and can install the OTA update data file 522. Referring now to FIG. 7, depicted is a flow chart showing an example method 700 of receiving a data file from a companion device, according to an example implementation of the present disclosure. The method 700 may be performed by the devices, components, or elements described above with reference to FIG. 1-FIG. 6, such as the primary device 502. As a brief overview, at step 702, a primary device may receive a notification. At step 704, the primary device may enter a network mode. At step 706, the primary device may transmit metrics. At step 708, the primary device may receive a data packet. At step 710, the primary device may write the data packet to a buffer. At step 712, the primary device may remain idle. At step 714, the primary device may determine whether additional packets are to be received. At step 718, the primary device may write a data file to memory.

At step 702, a primary device may receive a notification. In some embodiments, the primary device may receive the notification from a companion device communicably coupled to the primary device. The primary device may receive the notification indicating availability of a data file received by the companion device and destined for the primary device. In this regard, the companion device may receive the data file on behalf of the primary device. The primary device may receive the notification responsive to the companion device receiving the data file from a base station or other cellular network device. The primary device may receive the notification via a BLUETOOTH connection between the primary device and companion device. For example, the companion device may transmit the notification responsive to the companion device identifying or discovering the primary device and performing a pair procedure. The primary device may receive the notification responsive to the primary device being paired with the companion device, and the companion device transmitting the notification via the paired connection.

At step 704, the primary device may enter a network mode. In some embodiments, the primary device may enter the network mode responsive to the primary device receiving the notification (e.g., at step 702). The primary device may enter the network mode, to generate, establish, or otherwise provide a network to which the companion device can connect for transmitting the data file. The network may be or include a software enabled access point (SoftAP) network, a peer-to-peer (P2P) network, or other personal area network (PAN) or hotspot to which the companion device can connect. The companion device may connect to the network responsive to the primary device entering the network mode to provide the network.

At step 706, the primary device may transmit metrics. In some embodiments, the primary device may transmit metrics indicative of one or more device conditions of the primary device to the companion device. The primary device may transmit the metrics on the network provided by or maintained by the primary device (e.g., responsive to entering the network mode at step 704). In some embodiments, the primary device may detect, determine, measure, sense, or otherwise identify the metric(s) indicative of the device condition(s) of the primary device. The primary device may identify the metric(s) based on or according to data from one or more sensor(s) of the primary device. For example, the metrics may be indicative of a thermal or power condition of the primary device. The primary device may determine the thermal condition based on temperature measurements of a temperature sensor of the primary device. The thermal condition may be or include a current temperature, a rate of change of the temperature over a time period, a thermal output, etc. As another example, the primary device may determine a battery state corresponding to a battery or power storage device of the primary device. The battery state may be a current power level, a rate of change in power consumption, a thermal output of the battery or power storage device, etc. In some embodiments, the device condition may include available processing resources, current random access memory (RAM) usage or availability, number of applications executing on the primary device, or any other use case or context of the primary device. The primary device may transmit the metric(s) indicative of the device condition to the companion device. While shown as a single instance of transmitting metrics, in some embodiments, the method 700 may include transmitting additional/updated/revised metrics throughout the method 700.

At step 708, the primary device may receive a data packet. In some embodiments, the primary device may receive a data packet of a plurality of data packets corresponding to the data file (e.g., the data file which was indicated as being available via the notification received at step 702). The primary device may receive the data packet from the companion device. The primary device may receive the data packet from the companion device on a connection of the network provided responsive to entering the network mode at step 704. The primary device may receive the data packet responsive to the primary device generating the plurality of data packets. The primary device may receive each of the data packets at a duty cycle or data/packet rate/pattern determined by the companion device according to the device conditions (e.g., as described with reference to FIG. 8 below). Each data packet may include a respective portion of a payload for the data file. In this regard, the companion device may generate the plurality of data packets according to or using the data file for transmission to the primary device.

At step 710, the primary device may write the data packet to a buffer. In some embodiments, the primary device may write, maintain, move, or otherwise store the data packet received at step 708 in a first storage device of the primary device. The first storage device may be or include a buffer. The primary device may store the data packet to the buffer responsive to receiving the data packet from the companion device. The primary device may store the data packet in the buffer until each of the plurality of data packets corresponding to the data file are received.

At step 712, the primary device may remain idle. In some embodiments, the primary device may remain idle (e.g., in sleep, low-power, inactive, power-efficient state) between receiving two data packets of the plurality of data packets. In other words, the primary device may receive a first data packet (e.g., at step 708), write the data packet to the buffer (e.g., at step 710), and remain idle until another data packet is received. The primary device may remain idle by entering a sleep mode for instance. In some embodiments, the primary device may receive a control message from the companion device to prompt, trigger, or otherwise cause the primary device to enter the sleep mode. The primary device may enter the sleep mode by disabling a continuous reception mode corresponding to the network. For example, the primary device may disconnect or otherwise disable the connection on the network to the companion device while the primary device is in the sleep mode. In some embodiments, the primary device may enter the sleep mode for a duration. The duration may correspond to an off-duration or period of the duty cycle determined by the companion device. The primary device may passively cool while in the sleep mode.

At step 714, the primary device may determine whether additional packets are to be received. In some embodiments, the primary device may determine whether additional packets are to be received from the companion device. The primary device may determine whether additional packets are to be received based on a count of the number of packets currently received from the companion device and a total number of packets to be sent by the companion device to the primary device (e.g., which may be provided in the notification received at step 704), or by detecting a "last-packet" or end-of-transmission indication in a packet. Where additional packets are to be received, the method 700 may loop back to step 708 (e.g., where the primary device receives additional data packet(s), writes or stores the data packet(s) in the buffer, and remains idle for the duration). As such, the method 700 may loop between steps 708-714 until each of the data packets from the companion device have been received. Where no additional packets are to be received, the method 700 may proceed to step 716.

At step 718, the primary device may write a data file to memory. In some embodiments, the primary device write the plurality of data packets from the first storage device to a second storage device of the first device. The primary device may write the data file to memory responsive to each of the plurality of data packets being received. In some embodiments, the primary device may generate the data file using each of the plurality of data packets and responsive to receiving each of the data packets. The primary device may generate the data file by reconstructing the data file using payloads of each of the plurality of data packets. For example, the primary device may pull each of the plurality of data packets from the buffer. The primary device may then generate the data file using the payloads of each of the plurality of data packets. The primary device may write the data file to memory. The memory may be, for example, a random access memory (RAM) of the primary device. The primary device may execute the data file responsive to the data file being stored in RAM. For example, where the data file is an over-the-air (OTA) update data file for the primary device, processor(s) of the primary device may execute the OTA update data file and install the OTA update data file on the primary device.

Figure 8:
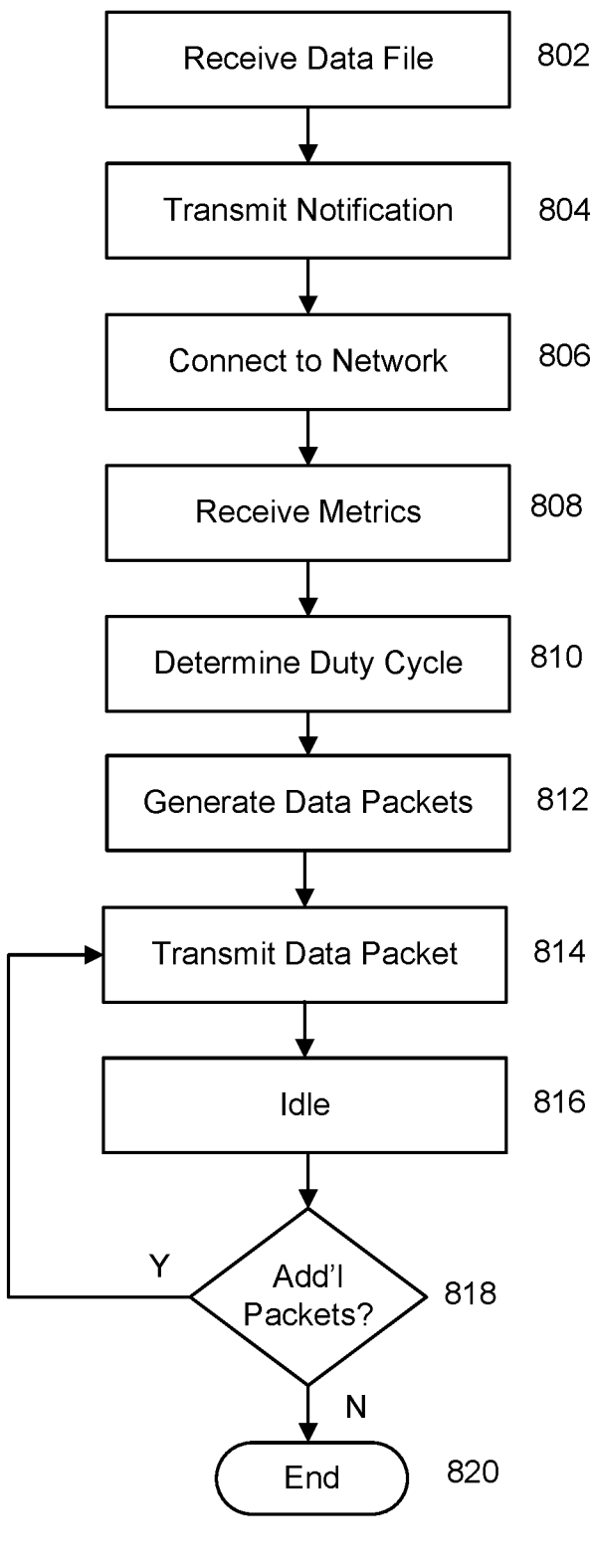
FIG. 8 is a flow chart showing an example method of transmitting a data file to a primary device, according to an example implementation of the present disclosure.

Referring now to FIG. 8, depicted is a flow chart showing an example method 800 of transmitting a data file to a primary device, according to an example implementation of the present disclosure. The method 800 may be performed by the devices, components, or elements described above with reference to FIG. 1-FIG. 6, such as the companion device 504. In this regard, and in various embodiments, the method 700 may be performed by a first device receiving a data file from a second device, and the method 800 may be performed by the second device transmitting the data file to the first device. As a brief overview, at step 802, a companion device may receive a data file. At step 804, the companion device may transmit a notification. At step 806, the companion device may connect to a network. At step 808, the companion device may receive metrics. At step 810, the companion device may determine a duty cycle. At step 812, the companion device may generate data packets. At step 814, the companion device may transmit a data packet. At step 816, the companion device may remain idle. At step 818, the companion device may determine whether additional packets are to be transmitted. At step 820, the method 800 may end.

At step 802, a companion device may receive a data file. In some embodiments, the companion device may receive a data file for transmission to a primary device. In some embodiments, the companion device may execute or otherwise run a companion application corresponding to the primary device. The companion application may be associated with a provider/manufacturer of the primary device. The companion device may receive the data file responsive to deployment and execution of the companion application on the companion device. It is noted that, while the method 800 is described generally as being performed by the companion device, the method 800 may be performed by the companion application executing on the companion device.

The companion device may receive the data file via a cellular or other wireless connection from a base station. The data file may be or include an over-the-air (OTA) update data file for the primary device. In some embodiments, the companion device may receive the data file responsive to receiving a push notification from an update service corresponding to the primary device. The companion device may request the data file responsive to receiving the push notification. The update service may push the data file to the companion device responsive to the request. The companion device may store the data file in a memory of the companion device.

At step 804, the companion device may transmit a notification. In some embodiments, the companion device may transmit the notification to the primary device. The companion device may transmit the notification responsive to receiving the data file from the update service via the base station. The companion device may transmit the notification following receiving the data file and responsive to being within range of the primary device. The companion device may discover and pair with the primary device. The companion device may transmit the notification via a paired connection with the primary device. The companion device may transmit the notification to indicate that the data file is available for transmission to the primary device. As such, the notification may indicate that the data file is available for transmission.download/transfer. The notification may include various information relating to the data file, such as a source of the data file, a data file size, a data file name, version number, etc.

At step 806, the companion device may connect to a network. In some embodiments, the companion device may connect to a network provided by or maintained by the primary device. The companion device may connect to the network provided by the primary device (e.g., described above with reference to step 704 of FIG. 7). The network may be or include a software enabled access point (SoftAP) network or a peer-to-peer (P2P) network.

At step 808, the companion device may receive metrics. In some embodiments, the companion device may receive the metrics indicative of one or more device conditions of the second device. The companion device may receive the metrics responsive to the primary device transmitting the metrics. The companion device may receive the metrics on the connection to the network established at step 806. The companion device may receive the metrics at various intervals or instances of the method 800, including at step 808 and at additional instances of step 808. The one or more device conditions may include a battery state of the primary device, a thermal condition of the primary device, a context or use case of the primary device, and so forth.

At step 810, the companion device may determine a data/packet rate/pattern, or duty cycle. As an example and in some embodiments, the companion device may determine a duty cycle for transmitting the data file (e.g., received at step 802) to the primary device. The companion device may determine the duty cycle according to the metrics received at step 808. The companion device may determine the duty cycle by selecting the duty cycle from a plurality of duty cycles. The companion device may select the duty cycle based on or according to estimated changes in the device condition(s) according to the respective duty cycle. For example, the companion device may simulate, estimate, predict, or determine a first change in the device condition(s) using a first duty cycle, a second change in device condition(s) using a second duty cycle, etc. The companion device may select the duty cycle based on or according to the estimated changes in device conditions. The duty cycle may have an on duration or period and an off duration or period. As described in greater detail below, the companion device may transmit individual data packet(s) corresponding to the data file during the on duration or period, and forego/halt/delay/defer/prevent transmission of data packets during the off duration or period to allow the primary device to passively cool.

At step 812, the companion device may generate data packets. In some embodiments, the companion device may generate a plurality of data packets according to the duty cycle (e.g., determined at step 810). The companion device may generate the plurality of data packets based on or using the data file received at step 802. The companion device may generate the plurality of data packets to include respective portions of the data file. For example, the companion device may generate the plurality of data packets by separating, chunking, or otherwise splitting a payload of the data file into a plurality of portions. In some embodiments, the companion device may select a size of the plurality of data packets. The companion device may select the size of the plurality of data packets based on or according to the duty cycle (e.g., which itself is determined according to the metric(s) indicative of the device conditions of the primary device).

The companion device may split the data file (e.g., the payload of the data file) into portions based on or according to a maximum size of a data packet and the duty cycle. The companion device may determine the maximum size of the data packet based on or according to a transmission speed (e.g., maximum bit rate, bandwidth, etc.) of the connection and the on duration for the duty cycle. In some embodiments, the companion device may generate the plurality of data packets by splitting the payload into substantially equal sized portions (e.g., less than the maximum size of a data packet). In some embodiments, the companion device may generate the plurality of data packets by splitting the payload into a first plurality of data packets having an equal sized payload equal to (and/or less than) the maximum size of a data packet, and a second data packet having the remainder portion of the payload. The companion device may store, write, move, or otherwise maintain the plurality of data packets in a queue for transmission to the primary device.

At step 814, the companion device may transmit a data packet. In some embodiments, the companion device may transmit a first data packet to the primary device. The companion device may transmit the first data packet via the connection to the network established at step 806. The companion device may transmit the first data packet during a first on-duration of the duty cycle. The companion device may transmit the first data packet from the queue to the primary device. The companion device may transmit the first data packet responsive to the start of an interval of the duty cycle.

At step 816, the companion device may remain idle. In some embodiments, the companion device may remain idle by waiting a duration according to the determined duty cycle. The duration may correspond to an off duration of the duty cycle. In some embodiments, the companion device may transmit a control message to the primary device, to cause the primary device to enter a sleep mode for the duration. The companion device may transmit the control message responsive to completing transmission of the first data packet at step 814. In some embodiments, the companion device may transmit the control message on or via the connection to the network of the primary device. In some embodiments, the companion device may transmit the control message on or via another connection outside of the network (e.g., similar to transmission of the notification at step 804).

At step 818, the companion device may determine whether additional packets are to be transmitted. The companion device may determine whether additional packets are to be transmitted to the primary device. In some embodiments, the companion device may determine whether additional packets are to be transmitted responsive to expiration of the off-duration corresponding to the duty cycle. The companion device may determine whether additional data packets are to be transmitted to the primary device based on whether any additional data packets are included in the queue for transmission. In some instances, where additional packets are in the queue for transmission to the primary device, the method 800 may proceed back to step 814 (e.g., where the companion device transmits a second data packet of the plurality of data packets via the network to the primary device). In this regard, the method 800 may loop between steps 814-818 until each of the plurality of data packets are transmitted from the companion device via the network to the primary device. Where the companion device has transmitted each of the plurality of data packets to the primary device, the method 800 may end (e.g., at step 820).

Referring generally to FIG. 7 and FIG. 8, depicted are flow charts showing example methods of transmitting and receiving a data file between a primary device and a companion device, respectively. FIG. 7 and FIG. 8 are described with reference to one embodiment in which the companion device is the transmitting device, and the primary device is the receiving device. It should be understood that the present disclosure is not limited to these arrangements. In particular, the present solution could be adapted to embodiments in which the companion device is the receiving device and the primary device is the transmitting device.

For example, the primary device may determine to transmit a data file to the companion device. The primary device may transmit, send, or otherwise provide a similar notification (e.g., as described above with reference to step 804) to the companion device. The primary and companion device may switch to the network mode, to connect to a network maintained by one of the devices (e.g., a SoftAP network or similar network). The companion device may determine the duty cycle for the primary device to transmit the data file to the companion device (e.g., in a manner similar to step 810, based on metrics received from the primary device). The companion device may transmit the duty cycle to the primary device. The primary device, upon receiving the duty cycle, may generate data packets (e.g., similar to step 812) according to the duty cycle. The primary device may transmit the data packets corresponding to the data file to the companion device according to the duty cycle.

As such, the present disclosure contemplates generation and transmission of data packets in both directions (e.g., from the companion device to the primary device, and/or from the primary device to the companion device).

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
determining, by a first device, a duty cycle for transmitting a data file to a second device, the duty cycle determined according to metrics indicative of one or more device conditions of the first device or the second device;
generating, by the first device, a plurality of data packets according to the duty cycle, each data packet including a respective portion of the data file; and
transmitting, by the first device to the second device, via a network maintained by one of the first device or the second device, each of the plurality of data packets at the determined duty cycle.

2. The method of claim 1, wherein the first device comprises a companion application executing on the first device, the companion application receiving the metrics, determining the duty cycle, and generating the plurality of data packets.

3. The method of claim 1, wherein determining the duty cycle comprises receiving, by the first device, data indicative of the duty cycle from the second device, the second device determining the duty cycle according to the metrics indicative of the one or more device conditions of the first device.

4. The method of claim 1, further comprising:
receiving, by the first device, the data file for transmission to the second device, the data file received via a cellular connection from a base station.

5. The method of claim 1, wherein the one or more device conditions comprise at least one of a battery state or a thermal condition of the first device or the second device.

6. The method of claim 1, wherein transmitting each of the plurality of data packets comprises:
transmitting, by the first device, a first data packet of the plurality of data packets via the network to the second device;
waiting, by the first device, a duration according to the determined duty cycle; and
transmitting, by the first device, responsive to expiration of the duration, a second data packet of the plurality of data packets via the network to the second device.

7. The method of claim 1, wherein the second device maintains the plurality of data packets in a buffer until each of the plurality of data packets are received from the first device.

8. The method of claim 1, further comprising selecting, by the first device, a size of at least some of the plurality of data packets according to the metrics indicative of the one or more device conditions.

9. The method of claim 1, further comprising:
determining, by the first device, a first estimated change in the one or more device conditions according to a first duty cycle;
determining, by the first device, a second estimated change in the one or more device conditions according to a second duty cycle; and
selecting, by the first device, the duty cycle from the first duty cycle and the second duty cycle, according to the first estimated change and the second estimated change.

10. The method of claim 1, further comprising:
transmitting, by the first device, a control message to the second device between transmitting one of the plurality of second data packets and another one of the plurality of data packets, the control message causing the second device to enter a sleep mode for a duration.

11. The method of claim 1, wherein the network comprises at least one of a software enabled access point (SoftAP) network or a peer-to-peer (P2P) network.

12. A first device comprising:
one or more processors configured to:
transmit, via a transceiver to a second device via a network maintained by the first device, metrics indicative of one or more device conditions of the first device;
receive, via the transceiver from the second device, a plurality of data packets at a duty cycle determined by the second device according to the one or more device conditions; and
generate a data file using each of the plurality of data packets, responsive to receiving each of the plurality of data packets.

13. The first device of claim 12, wherein the one or more processors are configured to:
store each data packet of the plurality of data packets in a first storage device of the first device, as the respective data packet is received from the second device; and
write the plurality of data packets from the first storage device to a second storage device of the first device responsive to each of the plurality of data packets being received.

14. The first device of claim 12, wherein the first storage device comprises a buffer, and the second storage device comprises a random access memory (RAM).

15. The first device of claim 12, wherein the network comprises at least one of a software enabled access point (SoftAP) network or a peer-to-peer (P2P) network.

16. The first device of claim 12, wherein the one or more processors are configured to:
enter a sleep mode between receiving a first data packet of the plurality of data packets and a second data packet of the plurality of data packets.

17. The first device of claim 12, wherein the one or more device conditions comprise at least one of a battery state or a thermal condition of the second device.

18. The first device of claim 12, wherein each data packet of the plurality of data packets comprise a portion of a payload for the data file.

19. The first device of claim 12, wherein the one or more processors are configured to:
receive, via the transceiver, a control message from second device responsive to receiving a first data packet of the plurality of data packets and prior to receiving a second data packet of the plurality of data packets; and
enter, responsive to receiving the control message, a sleep mode for a duration corresponding to the duty cycle.

20. A first device comprising:

one or more processors configured to:

determine a duty cycle for transmitting a data file to a second device, the duty cycle determined according to metrics indicative of one or more device conditions of the first device or the second device;

generate a plurality of data packets according to the duty cycle, each data packet including a portion of a payload of the data file; and transmit, to the second device, via a network maintained by one of the first device or the second device, each of the plurality of data packets at the determined duty cycle.

* * * * *